(12) United States Patent
Gonze et al.

(10) Patent No.: US 9,284,870 B2
(45) Date of Patent: Mar. 15, 2016

(54) ELECTRICALLY HEATED PARTICULATE MATTER FILTER SOOT CONTROL SYSTEM

(75) Inventors: Eugene V. Gonze, Pinckney, MI (US); Michael J. Paratore, Jr., Howell, MI (US); Garima Bhatia, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 1321 days.

(21) Appl. No.: 12/209,286

(22) Filed: Sep. 12, 2008

(65) Prior Publication Data
US 2009/0071129 A1  Mar. 19, 2009

Related U.S. Application Data

(60) Provisional application No. 60/972,326, filed on Sep. 14, 2007.

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/027* | (2006.01) |
| *F01N 9/00* | (2006.01) |

(52) U.S. Cl.
CPC ............... *F01N 3/027* (2013.01); *F01N 9/002* (2013.01); *Y02T 10/47* (2013.01)

(58) Field of Classification Search
USPC .................... 60/286, 295, 297, 311
See application file for complete search history.

(56) References Cited

U.S. PATENT DOCUMENTS

| | | | | |
|---|---|---|---|---|
| 4,505,726 | A | 3/1985 | Takeuchi | |
| 4,516,993 | A | 5/1985 | Takeuchi | |
| 4,974,414 | A | 12/1990 | Kono et al. | |
| 6,497,095 | B2 * | 12/2002 | Carberry et al. | 60/295 |
| 7,021,051 | B2 * | 4/2006 | Igarashi et al. | 60/295 |
| 7,677,028 | B2 * | 3/2010 | Kapparos et al. | 60/286 |
| 7,677,031 | B2 * | 3/2010 | Knitt | 60/295 |
| 2004/0172935 | A1 * | 9/2004 | Otake et al. | 60/295 |
| 2005/0086929 | A1 * | 4/2005 | Nieuwstadt et al. | 60/274 |

FOREIGN PATENT DOCUMENTS

| | | |
|---|---|---|
| DE | 3890556 C2 | 1/1993 |
| DE | 19906287 A1 | 8/2000 |
| DE | 10014224 A1 | 11/2000 |
| DE | 102004000065 | 6/2006 |

* cited by examiner

*Primary Examiner* — Kenneth Bomberg
*Assistant Examiner* — Dapinder Singh

(57) ABSTRACT

A regeneration system includes a particulate matter (PM) filter with an upstream end for receiving exhaust gas and a downstream end. A control module determines a current soot loading level of the PM filter and compares the current soot loading level to a predetermined soot loading level. The control module permits regeneration of the PM filter when the current soot loading level is less than the predetermined soot loading level.

8 Claims, 7 Drawing Sheets

ELECTRICALLY HEATED PARTICULATE MATTER FILTER SOOT CONTROL SYSTEM

CROSS-REFERENCE TO RELATED APPLICATIONS

This application claims the benefit of U.S. Provisional Application No. 60/972,326, filed on Sep. 14, 2007. The disclosure of the above application is incorporated herein by reference.

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to particulate matter (PM) filters, and more particularly to electrically heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve.

SUMMARY

A regeneration system includes a particulate matter (PM) filter with an upstream end for receiving exhaust gas and a downstream end. A control module determines a current soot loading level of the PM filter and compares the current soot loading level to a predetermined soot loading level. The control module permits regeneration of the PM filter when the current soot loading level is less than the predetermined soot loading level.

A regeneration method is provided and includes receiving an exhaust gas via an upstream end of a particulate matter (PM) filter. A current soot loading level of the PM filter is determined. The current soot loading level is compared to a predetermined soot loading level. Regeneration of the PM filter is permitted when the current soot loading level is less than the predetermined soot loading level. Regeneration of the PM filter is limited when the current soot loading level is greater than or equal to the predetermined soot loading level.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
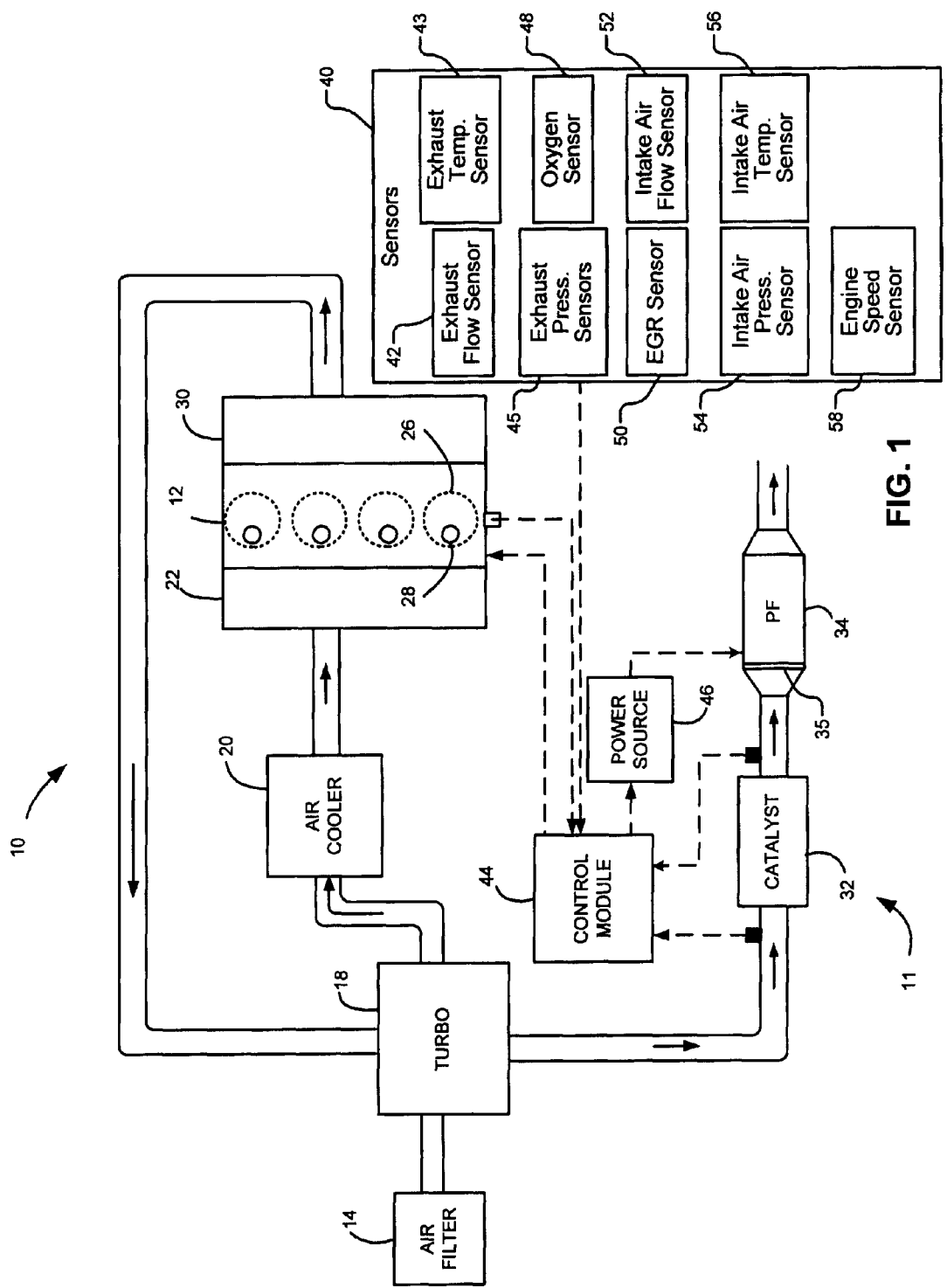
FIG. 1 is a functional block diagram of an exemplary engine system incorporating a regeneration system in accordance with an embodiment of the present disclosure.

The following description is merely exemplary in nature and is not intended to limit the present disclosure, application, or uses. It should be understood that throughout the drawings, corresponding reference numerals indicate like or corresponding parts and features.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an exemplary diesel engine system 10 that includes a regeneration system 11 is schematically illustrated in accordance with the present disclosure. It is appreciated that the diesel engine system 10 is merely exemplary in nature and that the regeneration system 11 described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate matter (PM) filter assembly 34 with a zoned inlet heater 35. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the zoned heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The zoned inlet heater 35 is spaced from the PM filter assembly 34 and heats the exhaust to a regeneration temperature as will be described below.

A control module 44 controls the engine and PM filter regeneration based on various sensed information and soot loading. More specifically, the control module 44 estimates loading of the PM filter assembly 34. When the estimated loading is at a predetermined level and/or the exhaust flow rate is within a desired range, current is controlled to the PM filter assembly 34 via a power source 46 to initiate the regeneration process. The duration of the regeneration process may be varied based upon the estimated amount of particulate matter within the PM filter assembly 34.

Current is applied to the zoned heater 35 during the regeneration process. More specifically, the energy heats selected zones of the heater 35 of the PM filter assembly 34 for predetermined periods, respectively. Exhaust gas passing through the heater 35 is heated by the activated zones. The heated exhaust gas travels to the downstream filter of PM filter assembly 34 and heats the filter by convection. The remainder of the regeneration process is achieved using the heat generated by the heated exhaust passing through the PM filter.

The above system may include sensors 40 for determining exhaust flow levels, exhaust temperature levels, exhaust pressure levels, oxygen levels, intake air flow rates, intake air pressure, intake air temperature, engine speed, EGR, etc. An exhaust flow sensor 42, an exhaust temperature sensor 43, exhaust pressure sensors 45, oxygen sensor 48, an EGR sensor 50, an intake air flow sensor 52, an intake air pressure sensor 54, an intake air temperature sensor 56, and an engine speed sensor 58 are shown.

Figure 2:
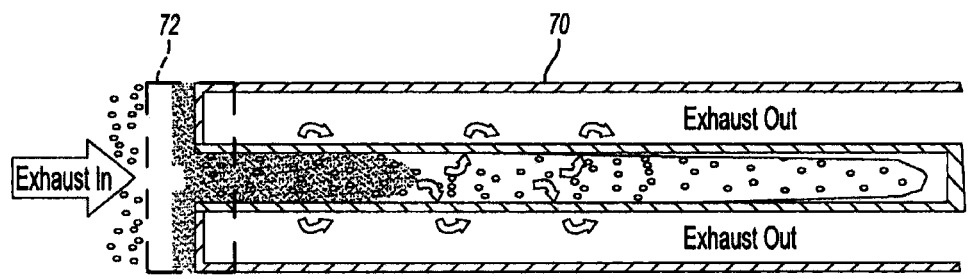
FIG. 2 illustrates heating within a PM filter.

Referring now to FIG. 2, illustrates heating within PM filter 70. The PM filter has a front heating zone 72 through which exhaust enters. The exhaust is heated, ignites and produces an exothermic reaction that propagates along the length of the PM filter 70.

Figure 3:
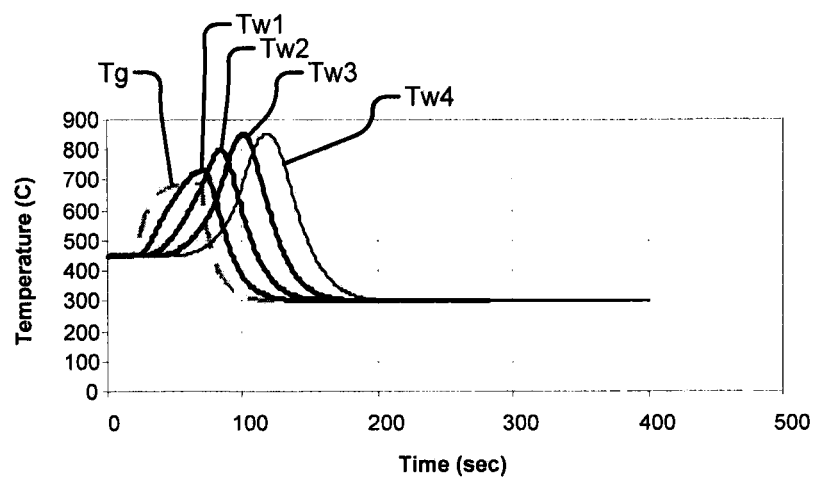
FIG. 3 is a graph of exemplary regeneration temperature curves for a PM filter with a particular soot loading.

Referring now to FIG. 3, a graph illustrating temperature curves for an exemplary PM filter, such as a diesel PM filter. The temperature curves correspond to a particular soot loading level, such as 2 g/l (grams/liter). Each of the temperature curves corresponds with temperatures experienced at an axial distance along the length of the PM filter. The axial distance is measured from the intake of the PM filter towards the output of the PM filter. The temperatures are shown over time. Five curves are shown, Tg, Tw1, Tw2, Tw3, and Tw4, respectively. Tg represents exhaust gas temperatures entering the PM filter over time. Tw1-Tw4 represent axial temperatures of the PM filter at 1 inch (in), 3 in, 5 in and 7 in positions, respectively over time. Although the temperature curves are shown for an approximate soot loading level of 2 g/l, temperatures curves for other soot loading levels may be generated. The peak temperatures of the PM filter increase along the PM filter from the input to the output of the PM filter.

Figure 4:
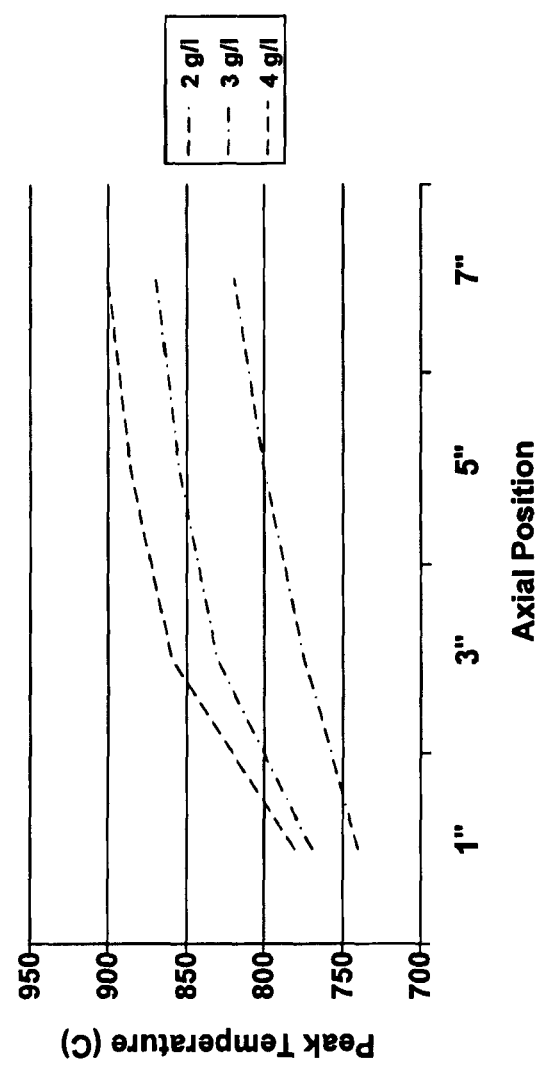
FIG. 4 is a graph of regeneration peak temperature curves for a PM filter with different amounts of soot loading.

Referring now to FIG. 4, is a graph of peak temperature curves that each correspond to peak temperatures along a PM filter during regeneration for a respective soot loading. Three curves are shown. The three curves represent 2 g/l, 3 g/l, and 4 g/l loading. The temperatures of the PM filter increase along the PM filter from the input to the output and with increased soot loading. Peak temperatures are higher with increased soot loading.

A PM filter may have a predetermined peak operating temperature. The peak operating temperature may be associated with a point of potential PM filter degradation. For example, a PM filter may begin to breakdown at operating temperatures greater than 800° C. The peak operating temperature may vary for different PM filters. The peak operating temperature may be associated with an average temperature of a portion of the PM filter or an average temperature of the PM filter as a whole.

To prevent damaging a PM filter, and thus to increase the operating life of a PM filter, the embodiments of the present disclosure adjust PM filter regeneration based on soot loading. A target maximum operating temperature $T_M$ is set for a PM filter. The target maximum operating temperature $T_M$ may correspond with a breakdown temperature of the PM filter. In one embodiment, the target maximum operating temperature $T_M$ is equal to the breakdown temperature multiple by a safety factor, such as 95%±2%. This safety factor is provided as an example only, other safety factors may be used.

Regeneration is performed when soot loading is less than or equal to a soot loading level associated with the maximum operating temperature $T_M$. The regeneration may be performed when soot loading levels are low or within a predetermined range. The predetermined range has a lower soot loading threshold $S_{lt}$ and an upper soot loading threshold $S_{ut}$ that is associated with the maximum operating temperature $T_M$. Limiting peak operating temperatures of a PM filter, minimizes pressures in and expansion of the PM filter. In one embodiment, soot loading is estimated and regeneration is performed based thereon. In another embodiment, when soot loading is greater than desired for regeneration, mitigation strategies are performed to reduce PM filter peak temperatures during regeneration.

Soot loading may be estimated from parameters, such as mileage, exhaust pressure, exhaust drop off pressure across a PM filter, by a predictive method, etc. Mileage refers to vehicle mileage, which approximately corresponds to or can be used to estimate vehicle engine operating time and/or the amount of exhaust gas generated. As an example, regeneration may be performed when a vehicle has traveled approximately 200-300 miles. The amount of soot generated depends upon vehicle operation over time. At idle speeds less soot is generated than when operating at travel speeds. The amount of exhaust gas generated is related to the state of soot loading in the PM filter.

Exhaust pressure can be used to estimate the amount of exhaust generated over a period of time. When an exhaust pressure exceeds a predetermined level or when an exhaust pressure decreases below a predetermined level, regeneration may be performed. For example when exhaust pressure entering a PM filter exceeds a predetermined level, regeneration may be performed. As another example when exhaust pressure exiting a PM filter is below a predetermined level, regeneration may be performed.

Exhaust drop off pressure may be used to estimate the amount of soot in a PM filter. For example, as the drop off pressure increases the amount of soot loading increases. The exhaust drop off pressure may be determined by determining pressure of exhaust entering a PM filter minus pressure of exhaust exiting the PM filter. Exhaust system pressure sensors may be used to provide these pressures.

A predictive method may include the determination of one or more engine operating conditions, such as engine load, fueling schemes (patterns, volumes, etc.), fuel injection timing, and an exhaust gas recirculation (EGR) level. A cumulative weighting factor may be used based on the engine conditions. The cumulative weighting factor is related to soot loading. When the cumulative weighting factor exceeds a threshold, regeneration may be performed.

Based on the estimated soot loading and a known peak operating temperature for a PM filter, regeneration is performed to prevent the PM filter from operating at temperatures above the peak operating temperature.

Designing a control system to target a selected soot loading allows PM filter regenerations without intrusive controls. A robust regeneration strategy as provided herein, removes soot from a PM filter, while limiting peak operating temperatures. Limiting of peak operating temperatures reduces thermal stresses on a substrate of a PM filter and thus prevents damage to the PM filter, which can be caused by high soot exotherms. Durability of the PM filter is increased.

When soot loading is greater than a threshold level associated with a set peak regeneration temperature, mitigation strategies may be performed to reduce PM filter peak temperatures during regeneration. For example, when a maximum soot loading threshold is set at approximately 2 g/l and current soot loading is 4 g/l, to minimize temperatures within a PM filter during regeneration engine operation is adjusted. The adjustment may include oxygen control and exhaust flow control.

Soot loading may be greater than an upper threshold level, for example, when an engine is operated to receive a high intake air flow rate for an extended period of time. Such operation may occur on a long freeway entrance ramp or during acceleration on a freeway. As another example, a soot loading upper threshold may be exceeded when throttle of an engine is continuously actuated between full ON and full OFF for an extended period of time. High air flow rates can prevent or limit regeneration of a PM filter.

During oxygen control, the amount of oxygen entering the PM filter is decreased to decrease the exotherm temperatures of the PM filter during regeneration. To decrease oxygen levels air flow may be decreased, EGR may be increased, and/or fuel injection may be increased. The fuel injection may be increased within engine cylinders and/or into the associated exhaust system. The burning of more fuel decreases the amount of oxygen present in the exhaust system.

A large increase in exhaust flow can aid in distinguishing or minimizing an exothermic reaction in a PM filter. Exhaust flow control may include an increase in exhaust flow by a downshift in a transmission or by an increase in idle speed. The increase in engine speed increases the amount of exhaust flow.

Figure 5:
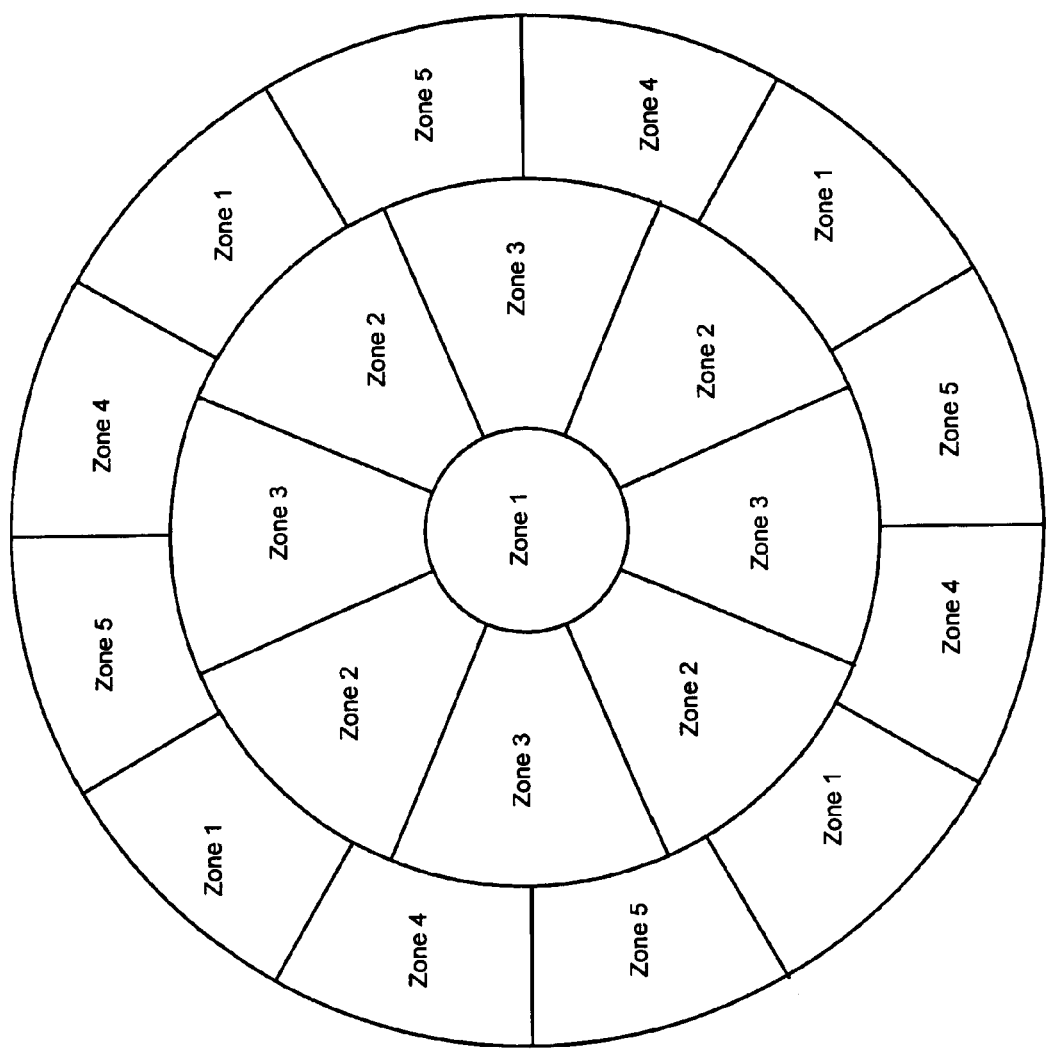
FIG. 5 illustrates exemplary zoning of a zoned inlet heater of an electrically heated PM filter.

Referring now to FIG. 5, another exemplary zoned inlet heater arrangement is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

The electrical heater may be spaced from the PM filter. In other words, the electric heater may be located in front of the PM filter but not in contact with the downstream PM filter. The heater selectively heats portions of the PM filter. The PM filter may be mounted close enough to the front of the PM filter to control the heating pattern. The length of the heater is set to optimize the exhaust gas temperature.

Thermal energy is transmitted from the heater to the PM filter by the exhaust gas. Therefore the PM filter is predominately heated by convection. The electrical heater is divided in zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter is regenerated by selectively heating one or more of the zones in the front of the PM filter and igniting the soot using the heated exhaust gas. When a sufficient face temperature is reached, the heater is turned off and the burning soot then cascades down the length of the PM filter channel, which is similar to a burning fuse on a firework. In other words, the heater may be activated only long enough to start the soot ignition and is then shut off. Other regeneration systems typically use both conduction and convection and maintain power to the heater (at lower temperatures such as 600 degrees Celsius) throughout the soot burning process. As a result, these systems tend to use more power than the system proposed in the present disclosure.

The burning soot is the fuel that continues the regeneration. This process is continued for each heating zone until the PM filter is completely regenerated.

The heater zones are spaced in a manner such that thermal stress is mitigated between active heaters. Therefore, the overall stress forces due to heating are smaller and distributed over the volume of the entire electrically heated PM filter. This approach allows regeneration in larger segments of the electrically heated PM filter without creating thermal stresses that damage the electrically heated PM filter.

Figure 6:
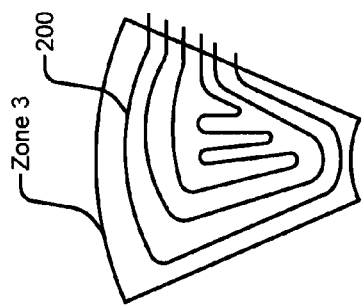
FIG. 6 illustrates an exemplary resistive heater in one of the zones of the zoned inlet heater of FIG. 5.

Referring now to FIG. 6, an exemplary resistive heater 200 arranged adjacent to one of the zones (e.g. zone 3) from the first circumferential band of zones in FIG. 5 is shown. The resistive heater 200 may comprise one or more coils that cover the respective zone to provide sufficient heating.

Figure 7:
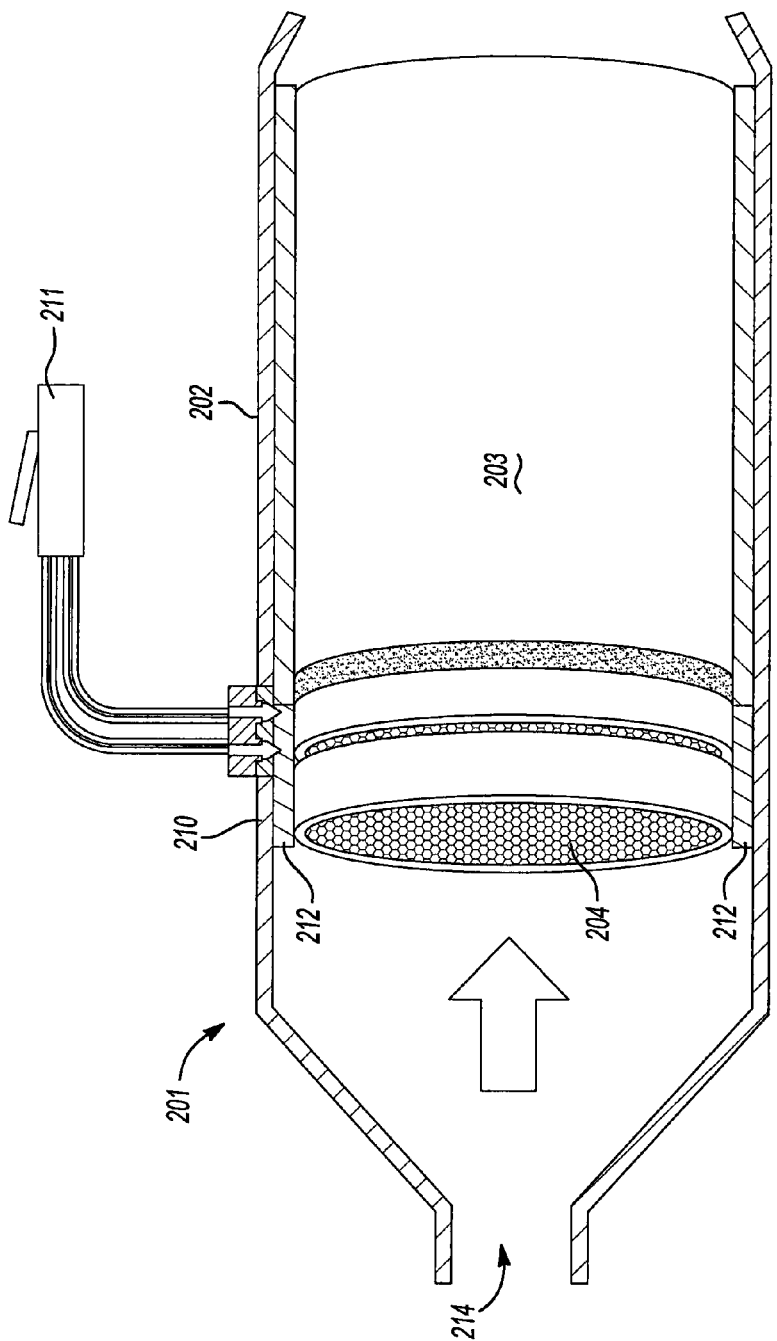
FIG. 7 illustrates an electrically heated PM filter that has a zoned electric heater that is spaced from the PM filter.

Referring now to FIG. 7, a PM filter assembly 201 is shown in further detail. The PM filter assembly 201 includes a housing 202, a filter 203, and the zoned heater 204. The heater 204 may be arranged between a laminar flow element 210 and a substrate of the filter 203. An electrical connector 211 may provide current to the zones of the PM filter assembly 201 as described above.

As can be appreciated, the heater 204 may be spaced from the filter 203 such that the heating is predominantly convection heating. Insulation 212 may be arranged between the heater 204 and the housing 202. Exhaust gas enters the PM filter assembly 201 from an upstream inlet 214 and is heated by one or more zones of the PM filter assembly 201. The heated exhaust gas travels a distance and is received by the filter 203. The heater 204 may be spaced from and not in contact with the filter 203.

Figure 8:
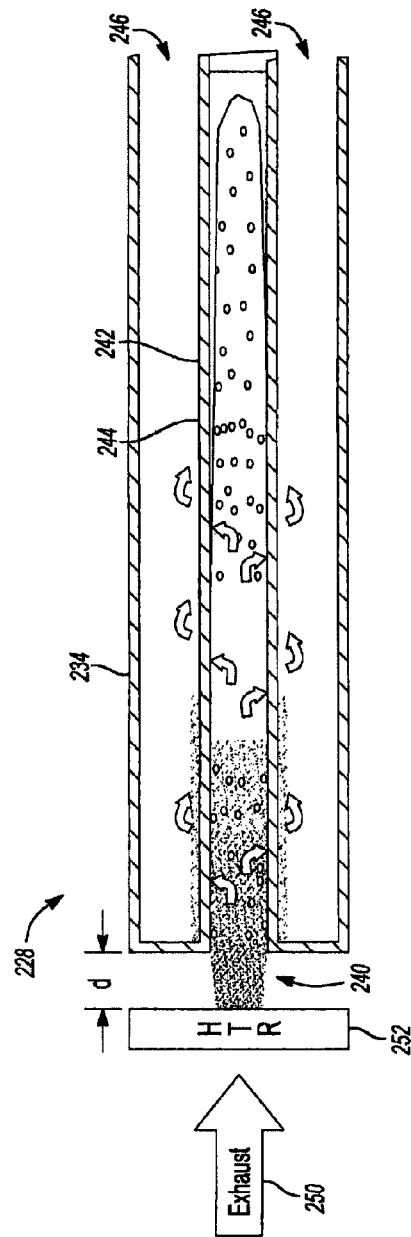
FIG. 8 illustrates heating within a PM filter assembly.

Referring now to FIG. 8, heating within a PM filter assembly 228 is shown in further detail. Exhaust gas 230 passes through a heater 232 and is heated by one or more zones of the heater 232. The heated exhaust gas travels a distance "d" and is then received by a PM filter 234. The distance "d" may be ½" or less. The PM filter 234 may have a central inlet 240, a channel 242, filter material 244 and an outlet 246 located radially outside of the central inlet 240. The PM filter 234 may be catalyzed. The heated exhaust gas causes PM in the PM filter 234 to burn, which regenerates the PM filter 234. The heater 232 transfers heat by convection to ignite a front (inlet) portion of the PM filter 234. When the soot in the front portion reaches a sufficiently high temperature, the heater is turned off. Combustion of soot then cascades down a filter channel 254 without requiring power to be maintained to the heater.

Figure 9:
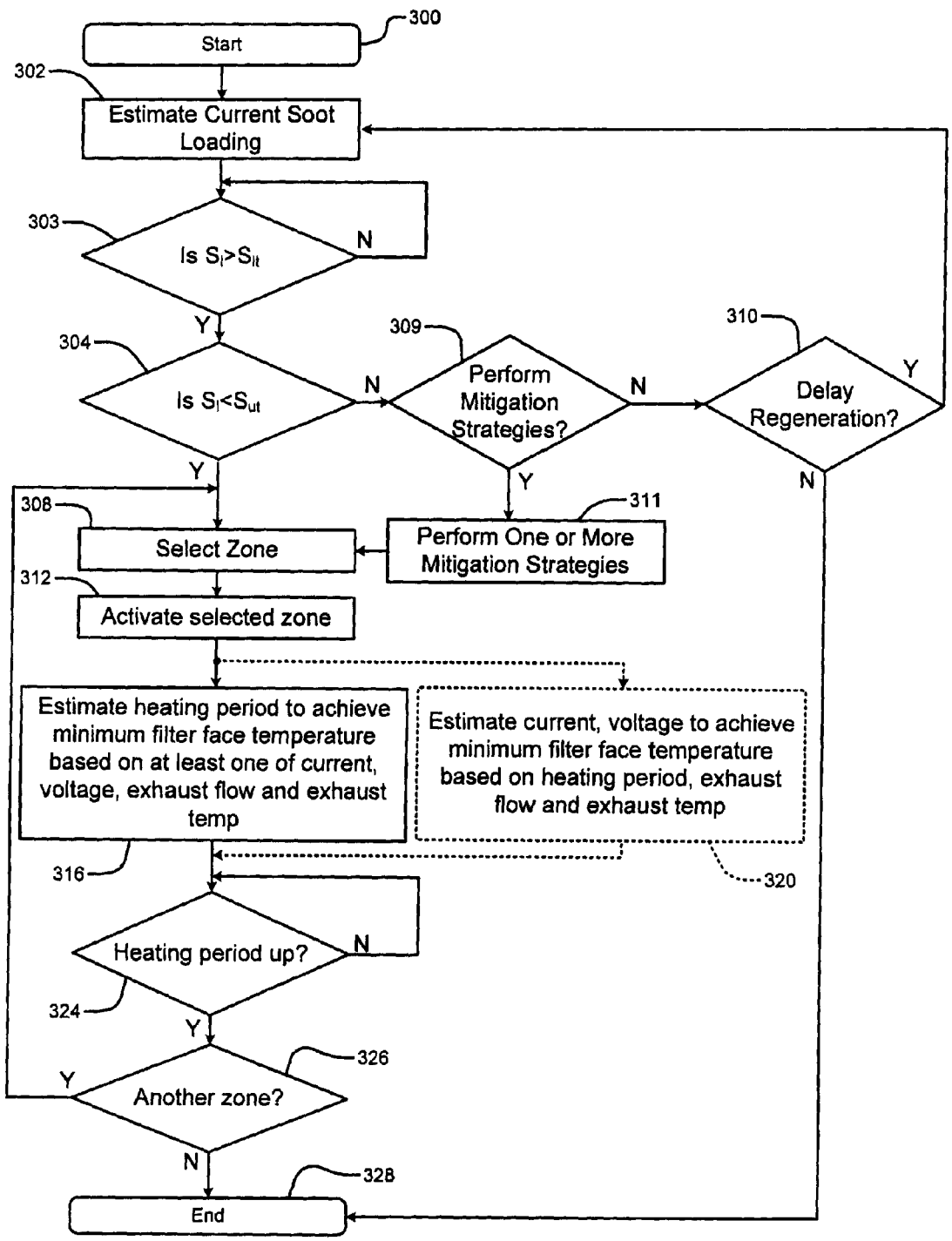
FIG. 9 illustrates a regeneration method for a PM filter.

Referring now to FIG. 9, steps for regenerating a PM filter are shown. In step 300, control of a control module, such as the control module 44, begins and proceeds to step 301. In step 301, sensor signals are generated. The sensor signals may include an exhaust flow signal, an exhaust temperature signal, exhaust pressure signal, oxygen signal, intake air flow signal, intake air pressure signal, intake air temperature signal, engine speed signal, an EGR signal, etc., which may be generated by the above-described sensors.

In step 302, control estimates current soot loading $S_l$ of the PM filter. Control may estimate soot loading as described above. The estimation may be based on vehicle mileage, exhaust pressure, exhaust drop off pressure across the PM filter, and/or a predictive method. The predictive method may include estimation based on one or more engine operating parameters, such as engine load, fueling schemes, fuel injection timing, and EGR. In step 303, control determines whether the current soot loading $S_l$ is greater than a soot loading lower threshold $S_{lt}$. When the current soot loading $S_l$ is greater than the lower threshold $S_{lt}$ control proceeds to step 304, otherwise control returns to step 302.

In step 304, control determines whether current soot loading $S_l$ is less than a soot loading upper threshold $S_{ut}$. The upper threshold $S_{ut}$ may correspond with a set PM maximum operating temperature, such as the maximum operating temperature $T_M$. When the current soot loading $S_l$ is less than the upper threshold $S_{ut}$ then control proceeds to step 308. When the current soot loading $S_l$ is greater than or equal to the upper threshold $S_{ut}$ then control proceeds to step 310.

In steps 309 and 310, control determines whether to delay or limit regeneration. Control may delay regeneration for a predetermined time period and/or perform mitigation strategies as described above to limit peak temperatures in the PM filter during regeneration. When regeneration is delayed for a predetermined time period, control may return to step 302 or 303. When regeneration is not delayed control may proceed to step 311 or end at step 328, as shown. Control may delay regeneration when mitigation strategies can not be performed or when mitigation strategies are incapable of preventing and/or limiting the peak temperature of the PM filter from exceeding a predetermined threshold. The threshold may be the upper threshold $S_{ut}$.

In step 311, control performs mitigation strategies. Step 311 may be performed while performing regeneration steps 312-324. Control proceeds to step 308 before, during or after performing step 311.

If control determines that regeneration is needed in step 304, control selects one or more zones in step 308 and activates the heater for the selected zone in step 312. In step 316, control estimates a heating period sufficient to achieve a minimum filter face temperature based on at least one of current, voltage, exhaust flow and exhaust temperature. The minimum face temperature should be sufficient to start the soot burning and to create a cascade effect. For example only, the minimum face temperature may be set to 700 degrees Celsuis or greater. As an alternate to step 316, in step 320, control estimates current and voltage needed to achieve minimum filter face temperature based on a predetermined heating period, exhaust flow and exhaust temperature. The current and voltage may be limited and/or adjusted before and/or during regeneration to prevent the temperature of the PM filter from exceeding the maximum operating temperature.

In step 324, control determines whether the heating period is up. If step 324 is true, control determines whether additional zones need to be regenerated in step 326. If step 326 is true, control returns to step 308. Otherwise control ends in step 328.

The above-described steps are meant to be illustrative examples; the steps may be performed sequentially, synchronously, simultaneously, continuously, during overlapping time periods or in a different order depending upon the application.

In use, the control module determines when the PM filter requires regeneration. The determination is based on soot levels within the PM filter. Alternately, regeneration can be performed periodically or on an event basis. The control module may estimate when the entire PM filter needs regeneration or when zones within the PM filter need regeneration. When the control module determines that the entire PM filter needs regeneration, the control module sequentially activates one or more of the zones at a time to initiate regeneration within the associated downstream portion of the PM filter. After the zone or zones are regenerated, one or more other zones are activated while the others are deactivated. This approach continues until all of the zones have been activated. When the control module determines that one of the zones needs regeneration, the control module activates the zone corresponding to the associated downstream portion of the PM filter needing regeneration.

The present disclosure may substantially reduce the fuel economy penalty, decrease tailpipe temperatures, and improve system robustness due to the smaller regeneration time.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A regeneration method comprising:
   receiving an exhaust gas via an upstream end of a particulate matter (PM) filter;
   determining a current soot loading level of the PM filter;
   comparing the current soot loading level to a predetermined soot loading level;
   regenerating the PM filter when the current soot loading level is less than the predetermined soot loading level;
   limiting the regenerating of the PM filter when the current soot loading level is greater than or equal to the predetermined soot loading level, wherein the predetermined soot loading level corresponds with a predetermined maximum operating temperature of the PM filter; and
   when the current soot loading level is greater than the predetermined soot loading level, performing a mitigation strategy to reduce peak temperatures of the PM filter while regenerating the PM filter.

2. The regeneration method of claim 1, wherein:
   the regenerating of the PM filter is permitted when the current soot loading level is within a soot loading level range that has a corresponding first soot loading limit and a second soot loading limit; and
   the second soot loading limit is greater than the first soot loading limit.

3. The regeneration method of claim 1, wherein the predetermined soot loading level corresponds with a predetermined maximum operating temperature of the PM filter that corresponds with a breakdown temperature of the PM filter.

4. The regeneration method of claim 1, wherein the current soot loading level is determined based on at least one of mileage, exhaust pressure, and an exhaust drop off pressure.

5. The regeneration method of claim 1, wherein the current soot loading level is determined based on a cumulative weighting factor that is based on at least one of engine load, fuel injection timing, and an exhaust gas recirculation level.

6. The regeneration method of claim 1, further comprising delays the regenerating of the PM filter when the current soot loading level is greater than or equal to a soot loading limit,
   wherein the regenerating of the PM filter is delayed for a predetermined time period, and
   wherein after the predetermined time period the regenerating of the PM filter is permitted.

7. The regeneration method of claim 1, further comprising reducing peak temperatures of the PM filter during the regeneration of the PM filter when the current soot loading level is greater than or equal to a soot loading limit by decreasing oxygen in the exhaust gas and by increasing flow of the exhaust gas.

8. The regeneration method of claim 1, further comprising adjusting current to a heater that is upstream from the PM filter to heat the exhaust gas and ignite soot in the PM filter when the current soot loading level is less than the predetermined soot loading level.

* * * * *